United States Patent [19]

Hall

[11] Patent Number: 4,529,838
[45] Date of Patent: Jul. 16, 1985

[54] SUPPORT BRACKET FOR ELECTRICAL INSULATOR

[76] Inventor: Gaddis G. Hall, 209 Kings Forest Dr., Leeds, Ala. 35094

[21] Appl. No.: 637,918

[22] Filed: Aug. 6, 1984

[51] Int. Cl.³ .................. H01B 17/14; H01B 17/20
[52] U.S. Cl. ............................ 174/158 R; 174/177
[58] Field of Search ............ 174/45 R, 140 R, 140 S, 174/141 R, 148, 158 R, 163 R, 169, 176, 177, 178, 179, 186, 194, 202, 211

[56] References Cited

FOREIGN PATENT DOCUMENTS 940400 10/1963 United Kingdom ............... 174/179

OTHER PUBLICATIONS

"Eight New Ways to Clean Up Your Overhead System", *Electrical World*, vol. 163, No. 14, Apr. 5, 1965, pp. 96 and 97.

*Primary Examiner*—Laramie E. Askin
*Attorney, Agent, or Firm*—Woodford R. Thompson, Jr.

[57] ABSTRACT

An insulator support bracket embodies an elongated insulating rod-like member connected at one end to an electrically conductive metallic end fitting and connected at its other end to an electrically conductive metallic base fitting. An electrical conductor element extends longitudinally of and inwardly of the surface of the insulating rod-like member and electrically connects the end fitting to the base fitting so that any current flowing from the end fitting to the base fitting will flow through the electrical conductor element rather than along the surface of the rod-like member.

4 Claims, 3 Drawing Figures

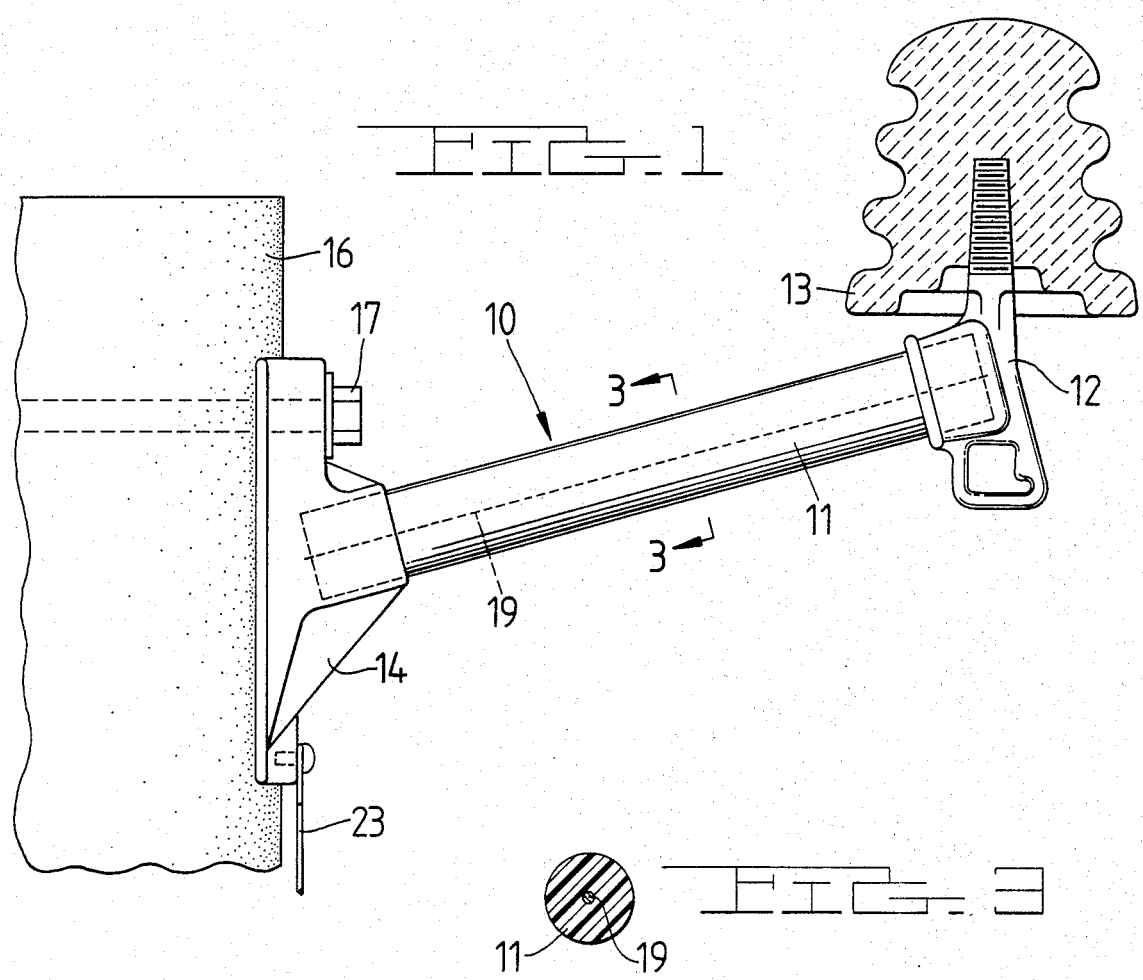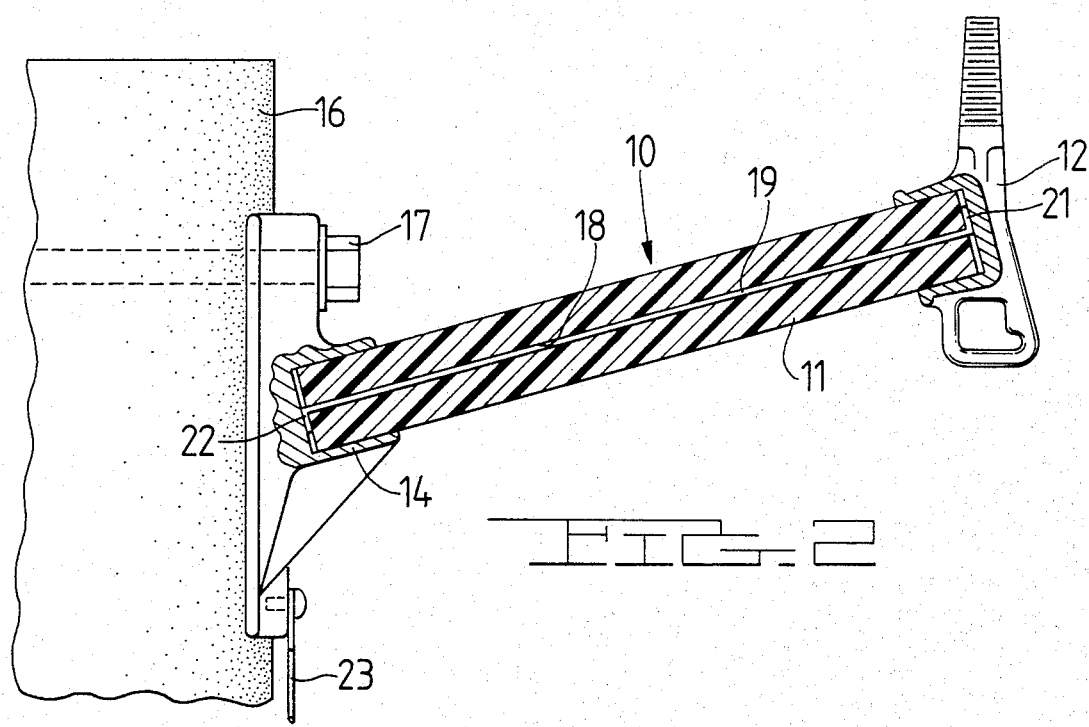

SUPPORT BRACKET FOR ELECTRICAL INSULATOR

BACKGROUND OF THE INVENTION

This invention relates to a support bracket for an electrical insulator and more particularly to an insulator support bracket adapted to carry an insulator element for supporting an electrical conductor member in spaced relation to a supporting structure, such as a pole for supporting a conductor of an electrical transmission line.

As is well known in the art to which my invention relates, the major complaint by electrical utilities against the use of fiberglass support brackets for insulator elements is that erosion occurs along the surface of prior art type fiberglass support brackets, thus resulting in a short life and reduction of the mechanical and electrical characteristics of such fiberglass support brackets. This erosion is primarily caused by leakage current flowing from the insulator element across the fiberglass support bracket to ground. This deterioration is proportional to the amount of current flow. That is, the higher the current, the more rapid the deterioration since the resistance to the current flow produces heat which breaks down or carbonizes the surface of the fiberglass support bracket. Accordingly, still greater amounts of current are permitted to flow across the surface of the support bracket whereby an ever-worsening condition is created until the insulator support bracket is weakened to the point that it fails under its mechanical load and/or loses its electrical insulating characteristics.

Another factor which greatly increases the leakage of current across the insulator is that in recent years a semiconductive coating has been applied to the top and around the neck of porcelain insulators. This additional increase in leakage of current further exaggerates the deterioration of the insulator support bracket.

As is well known, the reason for employing insulating support brackets is to remove the phase conductors off and away from the pole or other supporting structure to meet the National Electric Code requirements for safety reasons. It is thus recognized that such support brackets must be sufficiently strong to support the load imparted thereto by the weight of the conductors and at the same time must be adapted to separate the conductors to prevent them from coming together or moving into close proximity to each other and thus create a short circuit.

BRIEF SUMMARY OF THE INVENTION

To overcome the above and other difficulties, I provide an insulator support bracket having an elongated insulating rod-like member connected at one end to an electrically conductive end fitting and connected at its other end to an electrically conductive base fitting. Extending longitudinally of and inwardly of the surface of the insulating rod-like member is an elongated electrical conductor element which electrically connects the end fitting to the base fitting whereby any current flowing from the end fitting to the base fitting flows through the electrical conductor element rather than along the surface of the rod-like member. That is, any current flowing from the end fitting to the base fitting follows the path of least resistance which is through the electrical conductor element.

DESCRIPTION OF THE DRAWING

An insulator support bracket embodying features of my invention is illustrated in the accompanying drawing, forming a part of this application, in which:

FIG. 1 is a side elevational view, partly broken away and in section, showing my improved insulator support bracket mounted on a utility pole;

FIG. 2 is a side elevational view corresponding to FIG. 1 showing the elongated insulating rod-like member in section with the electrical conductor element extending longitudinally therethrough and with the porcelain insulator being omitted; and, FIG. 3 is a sectional view through the insulating rod-like member taken generally along the line 3—3 of FIG. 1.

DETAILED DESCRIPTION

Referring now to the drawing for a better understanding of my invention, my improved insulator support bracket indicated generally at 10 embodies an elongated insulating rod-like member 11 which is preferably formed of a plastic-like material, such as fiberglass or the like. One end of the rod-like member 11 is connected to an electrically conductive metallic end fitting 12 which may carry a conventional porcelain insulator 13, as shown in FIG. 1. In view of the fact that the metallic end fitting 12 and the porcelain insulator 13 carried thereby are of a conventional type, no further description thereof is deemed necessary.

The end of the elongated insulating rod-like member 11 opposite the end thereof connected to the end fitting 12 is connected to a base fitting 14. While I show the base fitting 14 as being secured to a utility pole 16 by bolts 17, it will be apparent that the base fitting 14 may be attached to supporting structures of other types. The ends of the elongated insulating rod-like element 11 may be secured to the end fitting 12 and the base fitting 14 by suitable means, such as by bonding the ends of the rod-like element 11 to the fittings 12 and 14 by means of a suitable adhesive.

As clearly shown in FIG. 2, a longitudinally extending opening 18 extends through the insulating rod-like element 11 along the axial center thereof in position to receive an electrical conductor 19. One end of the electrical conductor 19 is electrically connected to the metallic end fitting 12 as at 21 while the other end of the electrical conductor 19 is electrically connected to the base fitting 14 as at 22. As shown in FIGS. 1 and 2, the base fitting 14 may be grounded by a suitable ground element 23. It will thus be seen that the electrical conductor 19 electrically connects the metallic end fitting 12 to the metallic base fitting 14 whereby any current flowing from the end fitting 12 to the base fitting 14 flows through the electrical conductor 19 extending along the axial center of the insulating rod-like element 11. Since the current flows down the electrical conductor 19 rather than along the outer surface of the insulating rod-like element 11, erosion of the outer surface of the rod-like element 11 by electrical current flowing thereover is eliminated. Accordingly, the insulating rod-like element 11 is not gradually destroyed by erosion. By grounding the base fitting 14, any current flowing to the base fitting 14 is drained off to ground or left ungrounded whereby such current is permitted to flow along the surface of the pole 16 to ground.

The safety of the linemen working on the pole 16 is not affected by my improved insulator support bracket unless the porcelain insulator 13 is cracked, broken or punctured so that the end fitting 12 is energized. However, assuming that the end fitting 12 is thus energized, the base fitting 14 at the pole 16 is also energized and, if grounded, will relay itself out. On the other hand, if the base fitting 14 is not grounded, the current flow may not be sufficient to relay out the current flowing through the base fitting 14. The insulating value of my insulating rod-like element 11 extending between the two metallic fittings 12 and 14, voltage-wise, will be the thickness of the insulation between the outer surface of the rod-like element 11 and the conductor element 19 extending along the longitudinal center of the rod-like element 11. Accordingly, rod-like elements 11 of different diameters will have different insulating values which depend upon the thickness of the insulation between the outer surface of each rod-like element 11 and its conductor element 19.

From the foregoing, it will be seen that I have devised an improved insulator support bracket adapted to carry an insulator element for supporting an electrical conductor member in spaced relation to a supporting structure. By electrically connecting the end fitting 12 to the base fitting 14 by the electrical conductor element 19, any current flowing from the end fitting 12 to the base fitting 14 will flow through the electrical conductor element 19 rather than along the outer surface of the insulating rod-like element 11, thus eliminating erosion of the outer surface of the rod-like element 11 by electrical current flowing thereover. It will also be seen that I have provided an improved insulator support bracket of the character designated which is simple of construction and one which may be formed of a plastic-like material, such as fiberglass or the like.

While I have shown my invention in but one form, it will be obvious to those skilled in the art that it is not so limited, but is susceptible of various changes and modifications without departing from the spirit thereof.

I claim:

1. An insulator support bracket adapted to carry an insulator element for supporting an electrical conductor member in spaced relation to a supporting structure comprising:
   (a) an electrically conductive end fitting adapted to support said insulator element,
   (b) an electrically conductive base fitting adapted to be connected to said supporting structure,
   (c) an insulating rod-like element connected at one end to said end fitting and connected at its other end to said base fitting, and
   (d) an electrical conductor element extending longitudinally of and inwardly of the outer surface of said insulating rod-like element and electrically connecting said end fitting to said base fitting so that any current flowing from said end fitting to said base fitting flows directly through said electrical conductor element and follows a path of least resistance therethrough to ground rather than flowing along the outer surface of said insulating rod-like element whereby minimal electrical potential exists between said end fitting and said base fitting.

2. An insulator bracket as defined in claim 1 in which said electrically conductive end fitting and said electrically conductive base fitting are metallic fittings.

3. An insulator bracket as defined in claim 1 in which said electrical conductor element extends along the axial center of said insulating rod-like element.

4. An insulator bracket as defined in claim 1 in which said insulating rod-like element is an elongated fiberglass element having a longitudinally extending opening therethrough for receiving said conductor element.

* * * * *